United States Patent Office 3,179,190
Patented Apr. 20, 1965

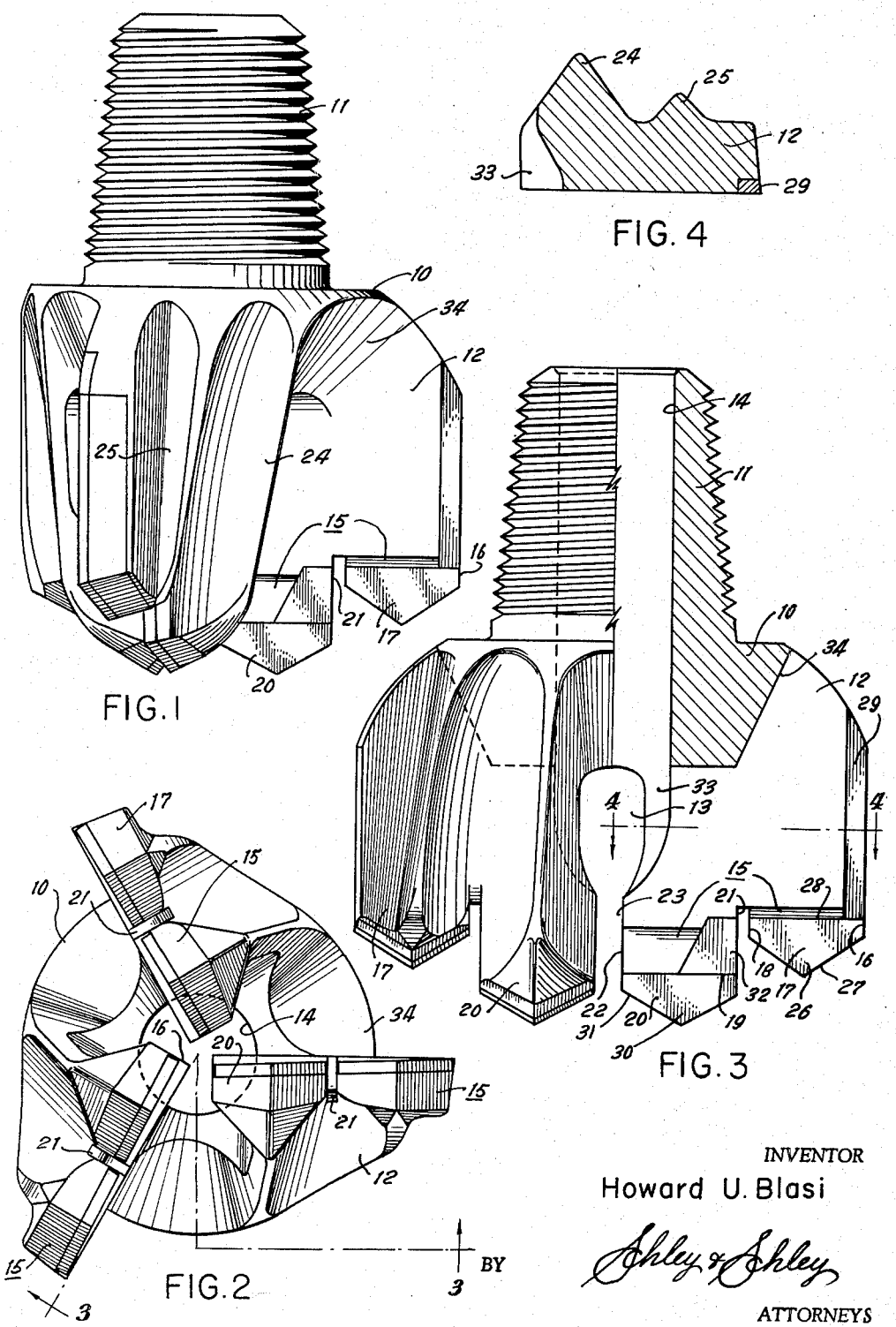

3,179,190
DRILL BIT WITH INSERTS
Howard U. Blasi, 410 SW. 10th, Seminole, Tex.
Filed Mar. 25, 1963, Ser. No. 267,482
1 Claim. (Cl. 175—391)

This invention relates to new and useful improvements in drill bits

The invention is directed in particular to drill bits of the drag type employed for the drilling of water and petroleum wells, as well as in drilling bore holes for seismographic exploration purposes and for other earth and earth formation drilling utilization.

The invention involves a drill bit having two, or preferably three or more drilling blades, each of which is divided into at least two drilling teeth or cutter teeth having thereon cutter faces terminating at their lower ends in V-shaped cutting edges, the apex of the cutter edge on the inner cutting tooth on each blade being disposed at a lower elevation than the apex of the cutting or cutter edges of the outer teeth. The invention is also characterized by providing a space between the inner longitudinal or vertical edges of the inner cutter teeth, surmounted by a somewhat enlarged space thereabove between the several cutter blades or shanks, and also by the provision of radial spacing between the inner and outer cutter teeth on each of the cutter shanks or blades. Further, the outer longitudinal or vertical edges of the inner cutter teeth are provided throughout their length with hard metal cutting inserts, extending substantially to the upper end of the recess or space between the inner and outer cutter teeth, and the outer cutter tooth is provided upon its outer longitudinal or vertical edge with a hard metal cutting insert extending from its lower extremity upwardly to the topmost end of the cutter blade or shank to provide a reaming and cutting edge throughout substantially the entire vertical dimension of the working or cutting portion of the drill bit.

By reason of the foregoing, it is the principal object of the invention to provide an improved drill bit including the features as recited, which drill bit maintains an optimum degree of simplicity and economy of manufacture, yet which drills very effectively, precluding the necessity of drilling the entire bottom of the bore hole and functioning to drill portions thereof while merely breaking off or shattering other portions thereof, the bit being unusually free of tendencies to retain accumulations of drilled material and remaining clean and in excellent cutting condition at all times.

Other and more particular objects of the invention will be apparent from a reading of the following description.

A construction designed to carry out the invention will be hereinafter described, together with other features of the invention.

The invention will be more readily understood from a reading of the following specification and by reference to the accompanying drawing, wherein an example of the invention is shown, and wherein:

FIG. 1 is a side elevational view of a drill bit constructed in accordance with this invention, FIG. 2 is a bottom plan view of the drill bit, FIG. 3 is a view partly in elevation and partly in vertical section taken upon the line 3—3 of FIG. 2, and FIG. 4 is a horizontal, cross-sectional view taken upon the line 4—4 of FIG. 3.

In the drawing, the numeral 10 designates a drill bit body having extending upwardly therefrom a tapered, screwthreaded pin 11 for securing the drill bit to a suitable support such as a drill stem or drill collar and having depending therefrom at least two and preferably three or more drilling or cutter shanks 12 spaced apart at their inner margins to form a relatively large central space 13 alined with the longitudinal axis of the drill bit. A water course 14 extends downwardly through the pin 11 and bit body 10, and opens at its lower end into the central space 13 for supplying drilling fluid to the drill bit for the usual purposes. As will appear more fully, the provision of the enlarged central space 13 functions to receive such drilling fluid and to distribute it readily and effectively over all of the cutting edges and surfaces of the bit.

In the particular embodiment of the invention illustrated, there are three of the cutter blades or shanks 12, equally spaced circumferentially around the bit body 10, but as noted, two, three, or more of the cutter shanks may be employed, it normally being desirable that the shanks be spaced more or less equidistantly from one another circumferentially of the bit.

Cutting teeth 15 depend from each of the cutter shanks 12, there desirably being provided a pair of cutting teeth upon each shank as illustrated in the drawing, arranged in spaced radial relationship so that the cutting faces of the teeth are disposed more or less radially of the bit body and face circumferentially of the bit in a counterclockwise direction as viewed from the underside of the bit (FIG. 2). The outer longitudinal or vertical edges 16 of the outer cutter teeth 17 are alined with and form continuations of the outer margins of the shanks 12, while the inner longitudinal or vertical edges 18 of the outer cutter teeth are radially spaced from the outer longitudinal or vertical edges 19 of the inner cutter teeth 20 to form a space 21 extending longitudinally of the bit between the inner and outer teeth. The inner longitudinal or vertical edges 22 of the inner teeth 20 are spaced radially inwardly from the inner margins of the shanks 12, but radially outwardly from the longitudinal axis of the drill bit to form an open flow space 23 underlying the central space 13 but being of less cross-sectional area than said central space. Thus, the cutter teeth do not extend entirely to the center of the cutting face of the bit but do extend completely to the periphery thereof.

The inner and outer cutter teeth have V-shaped lower ends, the apex of each of the inner cutting teeth 20 extending further downwardly than the apex of the outer cutter teeth 17. The cutter teeth 17 and 20 are reinforced upon their rearward sides by longitudinal backing ribs, 24 and 25 respectively, of substantially V-shaped cross section, as shown in FIG. 4 and extending from near the lower extremities of the cutter teeth to near the upper extremity of the bit body 10. The cutter faces of the outer cutter teeth 17 are formed by hard metal cutting inserts 26 having V-shaped lower cutting edges 27 conforming to the V-shaped lower edges of the teeth and having a transverse, upper rectilinear margin 28. Reamer cutting inserts 29 extend upwardly from the inserts 26 along the outer margins of the shanks 12 and form with the outer vertical edges of the inserts 26 a continuous, longitudinal or vertical reaming or cutting edge on the outer extremities on each cutting shank of the bit. Hard metal cutting inserts 30, substantially identical in shape to the inserts 26, form the cutting faces of the inner cutting teeth 20, and have V-shaped lower edges 31 forming cutting edges substantially conforming to the V-shaped lower ends of the teeth 20, while an additional hard metal cutting insert 32 extends upwardly from the inserts 30 along the outer longitudinal edges 21 of the inner cutter teeth so as to provide a longitudinal or vertical cutting edge on the inner side of the space 21 between the inner and outer cutter teeth. It is to be noted that the water course 14 opens downwardly into the center space 13 between the inner margins of the shanks 12, and that the latter are partially cut away as indicated at 33, the cut away portions 33, merging arcuately downwardly into the inner longitudinal edges 23 of the inner cutter teeth 20. Also, the bit body 10 is cut away outwardly and upwardly between each pair of the cutter shanks 12, as indicated at 34 to provide enhanced flow space for cutting and drillings being washed upwardly from the cutting teeth by the drilling fluid passing downwardly through the water course 14. It is noted that the hard-metal inserts 30 and 32 cause the inner cutting teeth 20 to have a hard-metal cutting edge extending throughout substantially the entire outer longitudinal edges of the teeth, and the inner longitudinal edges 22 of the inner teeth to be substantially free of hard metal.

In the operation of the bit, the vertical offsetting of the inner cutter teeth and the outer cutter teeth provides for maintaining the bit centrally disposed of the well bore, the space between the inner margins or longitudinal edges of the inner cutter teeth, as well as the provision of the spaces 21 causing the bit to function not only to cut the formation but also to break off those portions entering said spaces whereby more effective and more efficient drilling action is obtained. At the same time, the provision of the full length reaming cutters 29 ensures maintenance of full well bore gauge and the drilling of a well bore of uniform and unrestricted diameter.

The central space 13 is utilized for directing a full flow of the drilling fluid downwardly through the water course 14 and outwardly over the cutting faces of the several cutting shanks to maintain unimpeded flow the drilling fluid against the bottom of the well bore to flush cuttings therefrom as well as around and upwardly over the cutting face, cutting teeth and cutting shanks to maintain the same in a very clean and unimpaired condition for full cutting efficiency, the cutout portions 34 allowing for full and unimpeded passage of drillings or cuttings from the earth formation upwardly in the well bore exteriorly of the bit and entrained in the upwardly moving drilling fluid.

The foregoing description of the invention is explanatory thereof and various changes in the size, shape and materials, as well as in the details of the illustrated construction may be made, within the scope of the appended claim, without departing from the spirit of the invention.

What I claim and desire to secure by Letters Patent is:

A drill bit including a bit body, means for securing the bit body to a drill support, cutter shanks depending from the bit body having their inner margins spaced apart to define a central space along the longitudinal axis of the bit, each shank having inner and outer cutter teeth depending therefrom with inner and outer rectilinear edges extending longitudinally of the bit, the inner teeth having their inner longitudinal edges spaced apart a distance less than that by which the inner margins of the shanks are spaced apart to define a flow space less in cross-sectional area than the central space between the shanks and disposed therebelow, the outer longitudinal edges of the inner teeth being spaced apart from the inner longitudinal edges of the outer teeth radially of the bit body, the cutter teeth on each shank having flat cutter faces disposed in a substantially longitudinal plane extending radially of the bit body, the cutter faces terminating at their lower ends in V-shaped cutter edges having depending apices, the apices of the cutter edges of the inner teeth depending farther from the cutter shanks than the apices of the cutter edges of the outer teeth, longitudinal hard-metal inserts defining the outer longitudinal edges of the inner cutter faces and extending substantially through the length of said outer longitudinal edges, the inner longitudinal edges of the inner cutting faces being substantially free of hard-metal inserts, and hard-metal reaming inserts in the outer longitudinal edges of the outer teeth extending longitudinally upwardly throughout the outer margins of the shanks.

References Cited by the Examiner

UNITED STATES PATENTS 3,099,325    7/63    Purser _____ 175—391

FOREIGN PATENTS 344,635    3/31    Great Britain.
639,303    6/50    Great Britain.

BENJAMIN HERSH, *Primary Examiner.*